United States Patent Office 3,135,634
Patented June 2, 1964

3,135,634
SOLID EXPLOSIVE COMPOSITION AND METHOD OF PREPARATION EMPLOYING VULCANIZED RUBBER AND A SOLID INORGANIC OXIDIZING SALT
David Pelton Moore, Marlow, N.H.
(9210 Flower Ave., Silver Spring, Md.)
No Drawing. Filed Jan. 10, 1962, Ser. No. 165,456
8 Claims. (Cl. 149—19)

The present invention relates to improvements in explosives and the methods of making same, the present application being a continuation-in-part for the application filed October 21, 1960, Serial No. 63,984, now abandoned.

One object of the present invention is the production of a high explosive for use as a blasting powder, a solid propellant, and a substitute for black powder.

Another object of the invention is the use of an element that when mixed with certain alkali metal salts, taken from the groups of nitrates, chlorates and perchlorates, shaped and dried, produces a non-hygroscopic and waterproof explosive by air vulcanization and which when a certain percentage of sulphur is added, can be heat, pressure and time vulcanized to produce a solid propellant.

Still another object of the present invention is the production of a vulcanized rubber solid propellant which after being mixed, shaped and dried, is subjected to heat, pressure and the usual time vulcanization to produce a solid propellant explosive that is non-chipping, non-hygroscopic and waterproof.

Still another object is the provision of a new method of compounding and making the explosive, and by means of which, as water is contained in the original mixture, does not require special machinery for mixing, shaping, drying and vulcanizing.

When using natural ammoniated rubber latex, a combination of ingredients must be employed to obtain a rubber binder for the oxygen and gas supplying alkali metal salts, that is, as set forth in U.S. Patents Nos. 2,333,032 and 2,341,055, and also an aqueous solution of lime or plaster of Paris, mixed with calcium sulphite or calcium sulphate and sodium carbonate. That is, the natural rubber latex must be reduced to not less than 20% solid, by this solution of any of the two patents, and the latter. In each solution, there is a coagulating agent, and a retarding agent of such coagulation, the latter being employed to hold the latex in solution when in bulk, but not to hinder, but only slightly retard coagulation, or what is known in the trade as air vulcanization, for when either of these solutions with the latex is spread on a flat surface in the open air, it soon forms a non-tacky sheet of clear rubber. The retarder therefore must be used, for if the coagulating agent is mixed solely with the latex, the solid will instantly form, and is useless for the purpose here intended. When this latex binder is employed as a vehicle in making a solid propellant, 3% of sulphur based on the solid rubber content of the rubber latex is added to the solution or into the rubber latex.

The hydroxide or lime water used as a coagulating agent, is of 100 hydrometer test, using about 2 pounds of slack lime or plaster of Paris, to a gallon of soft water, and one pint of the retarder solution made preferably of ¼ ounce to one pint, ¼ ounce of calcium sulphite and ¼ ounce of sodium carbonate dissolved separately or together to make one pint of water, and then mixed with the hydroxide or plaster of Paris, the latter being a sulphate which is preferred when the explosive is to be made into a solid propellant by heat, pressure and time vulcanization.

There are several formulations that use this rubber binder, as for instance:

EXAMPLE NO. 1

| | Percent |
|---|---|
| Alkali metal salts, such as potassium chlorate, potassium perchlorate, ammonium perchlorate, ammonium chlorate, ammonium nitrate, sodium nitrate, and combinations thereof | 85.10 |
| Rubber binder | 12.34 |
| Moisture | 0.21 |
| Ether extract | 2.35 |

EXAMPLE NO. 2

| | |
|---|---|
| Alkali metal salts, as in Example No. 1 | 88.88 |
| Rubber binder | 4.05 |
| Starch, according to Himalaya Patent No. 853,085 | 6.50 |
| Moisture | 0.57 |

EXAMPLE NO. 3

*Substitute for Black Powder*

| | Percent |
|---|---|
| Alkali metal salts, as in Example No. 1 | 62 |
| Rubber binder | 18 |
| Sulphur | 20 |

The examples above set forth are the preferred ones, but these may be varied as stated below:

For instance, in mixing the ingredients set forth in Example No. 1, any one of the oxygen and gas supplying agents, or even combinations thereof, may vary from 65 to 85.10%, these being pulverized to as fine as possible, 280 screen preferred, and are mixed intimately with a rubber binder, the solid rubber content of which may vary from 4.05 to 25%. Thus, there is formed a putty or dough-like mass, which is then molded to the shape of grains, pellets, sheets or solids, and subjected to drying. This drying may be in the open air, at normal temperatures, or by heating in an oven on a slowly moving belt, up to 180 degrees F., or by infra-red light and heat alone, or combined with the oven heat, so that the material is then reduced to below 0.21% moisture content. This explosive is specially desirable as a blasting powder, which can be used in bulk, to be rammed in the bore to be exploded by electric spark, or in waxed paper tubes as with dynamite.

The explosive in Example No. 2 is mixed similarly, the starch having been water swollen by heat to about 80° C., from 5 to 10 minutes, as set forth in the Himalaya patent, and then mixed with other ingredients, in which the oxygen and gas supplying alkali metal salts, may vary from 65 to 88.88%, the starch from 6.50 to 20%, and the rubber binder from 4.05 to 25%, with final moisture of less than 0.57%. This is an excellent blasting powder, and is mixed and finished as in Example No. 1.

When the explosives made in accordance with Examples Nos. 1 and 2, and any of their variations are to be made into a solid propellant, 3% of sulphur, based on the solid rubber content of the binder, is added to the latex in the "mix," and then the shaped and dried propellant grain or circular hollow disk form are then placed in a vulcanizing mold, and subjected to heat, pressure and time to produce a non-hygroscopic, non-chipping and waterproof rubber-like object. The preferred vulcanizing pressures vary from 170–180 pounds to the square inch, the heat may vary from 290 to 305 degrees F., for from one hour to one hour and twenty minutes. Relative to the solid matter, the period of time can be reduced down to from 12 minutes up to the hour and twenty minutes, according to the size or section of the propellant.

In mixing the explosive set forth in Example No. 3, the alkali metal salts, preferably sodium nitrate, varying from 55 to 80%, and the sulphur varying from 12 to 25%, are mixed intimately, and then the rubber binder carrying from 4.05 to 25% solid rubber is intimately mixed with the above combination to a putty or dough-like mass, after which the same is made into small granules, pellets, or sheets, or even in solid grains as for missile and rocket use, as for Examples Nos. 1 and 2, then dried, as a substitute for black powder. This explosive, however, gives off a white readily diffusible smoke, and dispenses with the usual wheel mill, the press mill, the corning mill and the glazing operation as in the manufacture of commercial black powder, for after it is shaped, it is dried at normal temperatures in the open air, in a heated open oven at 180 degrees F., or under infra-red light and with or without the oven heat. Where it is to be made into a solid propellant, there is sufficient sulphur in the "mix," that it can be molded into grains or disks, dried, and heat, pressure and time vulcanized, as stated above, or oven and air drying.

When using the synthetic rubber latices, such as Geon 576 and Exon, a methacrylic resin, in which the solids are variable, a thickener must be incorporated in the latex. It has been found that to 94% of this latex, 6% of such thickener (a methacrylic resin is added to the latex), after fully stirring, the latex is thickened, and if too thick can be thinned by stirring in water. Each of the latices, however, before the thickener is added, must have the coagulating and retarding solutions incorporated thoroughly to reduce the solids to the desired solid content, so that in the end result the explosive composition has non-hygroscopic, non-tacky, non-chipping and waterproof qualities. Any of the coagulating and retarding solutions before-mentioned, are applicable to these latices after being thickened. Also, in this type of explosive composition, sulphur can be added to the mixture, to permit heat, pressure and time vulcanization, similarly to, as before set forth, making solid propellants.

It has been discovered that each of the latices, that is of natural rubber and synthetic, that before either is mixed with the oxygen and gas supplying alkali metal salt or salts, one of the respective coagulators with one or more retarders must be commingled therewith, as this latex mixture when placed in a sealed container will remain non-coagulated for a long period of time, but when spread or mixed with other ingredients and exposed to air or heat drying, will produce a clear, tough varnish-like surface on whatever it coats.

All percentages of ingredients herein set forth are by weight.

Heretofore, as in the U.S. patent to Bonell and Juhlin, No. 2,622,277, rubber with oxygen and gas supplying agents have been set forth. However, this rubber was not a flowable natural or synthetic latex, and to prove this, ground carbonized rubber was mixed with casein, the latter having been mixed in boiling water to produce a putty-like mass to receive the potassium perchlorate, this not being mentioned in the said Letters Patent. This mixture, to make it homogeneous, was confined in a metal jar cap, and then pressed between this cap and a metal disk to produce a dense disk of the mixture. The rubber showed incomplete mixture, and this sample when ignited produced dense black smoke and considerable ash. Also, when the separate dry ingredients, that is carbonized ground rubber, casein and potassium perchlorate, were mixed and burned, they acted similarly to the compressed ingredients.

The one patent, No. 2,067,213, to Snelling, uses "latex," but made no mention of the coagulating and retarding agents set forth in the present explosive composition. When pure 60–64% natural latex was mixed with potassium perchlorate and also potassium chlorate, it was impossible to separate and dry particles thus coated, as the particles were sticky and tacky, and when placed together cohered into a solid sticky and tacky mass and was unsuitable as a latex-coated or bound explosive composition.

Thus, from the foregoing, it is apparent that after using a flowable vulcanizable latex, either of the natural latex or the Government synthetic rubber latex, a non-hygroscopic, non-chipping, non-tacky and waterproof explosive without heat, pressure and time vulcanization results. When sulphur is added and the grain is heat, pressure and time vulcanized, as in making vulcanized rubber, such solid propellant is non-chipping, non-hygroscopic, non-tacky and waterproof.

The explosive compositions herein set forth are of the progressively burning type.

In lieu of a portion of the rubber binder, casein may be used and preferably that of the Borden Cascoloid ST. 227 and ST. 52. In using these, the rubber content can be cut from 20% to 50%.

What is claimed is:

1. The method of making an explosive composition comprising mixing intimately together 65–80% by weight of oxygen and gas supplying alkali salts selected from the group consisting of ammonium nitrate, ammonium perchlorate, ammonium chlorate, potassium chlorate, potassium perchlorate, and sodium nitrate with a rubber binder consisting of a rubber latex containing 20–64% by weight of solid rubber, the remainder of said binder consisting of a coagulating agent selected from the group consisting of calcium hydroxide and sodium bisulphite and a retarder of coagulation selected from the group consisting of calcium sulphite, sodium perborate and sodium carbonate and mixtures thereof to form a putty-like mass, molding the mass into a desired shape, drying the shaped mass to produce a non-tacky, non-hygroscopic and waterproof explosive composition containing 4.05–25% by weight of solid rubber based on the total composition.

2. The method of making an explosive composition comprising mixing intimately together 65–80% by weight of oxygen and gas supplying alkali salts selected from the group consisting of ammonium nitrate, ammonium perchlorate, ammonium chlorate, potassium chlorate, potassium perchlorate and sodium nitrate, 3% by weight of sulphur based on the solid rubber content of the binder and a rubber binder consisting of a rubber latex containing 20–64% by weight of solid rubber, the remainder of said binder consisting of a coagulating agent selected from the group consisting of calcium hydroxide and sodium bisulphite and a retarder of coagulation selected from the group consisting of calcium sulphite, sodium perborate, and sodium carbonate and mixtures thereof, molding the mass into a desired shape, drying the shaped mass, and subjecting the dried shaped mass to a pressure of 170–180 pounds to the square inch at a temperature of from 290° F., for one hour to one hour and twenty minutes to produce a non-tacky, non-chipping, non-hygroscopic and waterproof composition.

3. The method of making an explosove composition comprising mixing intimately together 65–88% by weight of oxygen and gas supplying alkali salts selected from the group consisting of ammonium nitrate, ammonium perchlorate, ammonium chlorate, potassium perchlorate, potassium chlorate, and sodium nitrate, 6.5% by weight of starch and a rubber binder consisting of rubber latex containing 20–64% by weight of solid rubber, the remainder of said binder consisting of a coagulating agent selected from the group consisting of calcium hydroxide and sodium bisulphite and a retarder of coagulation selected from the group consisting of calcium sulphite, sodium perborate, sodium carbonate and mixtures thereof, to form a putty-like mass, molding the mass into a desired shape, drying the shaped mass to produce a non-tacky, non-hygroscopic and waterproof explosive composition which contains 4.05–25% by weight of solid rubber based on the total composition.

4. The method of making an explosive composition comprising mixing intimately together 65–88% by weight of oxygen and gas supplying solid inorganic oxidizing alkali salts selected from the group consisting of ammonium nitrate, ammonium perchlorate, ammonium chlorate, potassium perchlorate, and sodium nitrate with a casein and a rubber binder consisting of a rubber latex containing 20–64% by weight of solid rubber, the remainder of said binder consisting of a coagulating agent selected from the group consisting of calcium hydroxide and sodium bisulphite and a retarder of coagulation selected from the group consisting of calcium sulphite, sodium perborate and sodium carbonate and mixtures thereof to form a putty-like mass, molding the mass into a desired shape, drying the shaped mass to produce a non-tacky, non-hygroscopic and waterproof explosive composition containing 4.05–25% by weight of solid rubber based on the total composition.

5. An explosive comprising mixture of an oxygen and gas supplying agent selected from a group consisting of ammonium nitrate, ammonium chlorate, ammonium perchlorate, potassium chlorate, potassium perchlorate, and sodium nitrate, 88% by weight, starch 6.50% by weight and a flowable curable rubber binder 4.05% by weight.

6. An explosive composition produced by the method set forth in claim 1.

7. An explosive composition produced by the method set forth in claim 2.

8. An explosive composition produced by the method set forth in claim 3.

References Cited in the file of this patent
UNITED STATES PATENTS

| | | |
|---|---|---|
| 2,966,403 | Weil | Dec. 27, 1960 |
| 2,974,026 | Batchelder | Mar. 7, 1961 |
| 2,991,166 | Ferguson | July 4, 1961 |
| 2,997,376 | Bartley | Aug. 22, 1961 |
| 3,003,861 | Reynolds et al. | Oct. 10, 1961 |